United States Patent
Fano et al.

(10) Patent No.: US 11,250,334 B2
(45) Date of Patent: Feb. 15, 2022

(54) SOLVING COMPUTATIONAL TASKS USING QUANTUM COMPUTING

(71) Applicant: Accenture Global Solutions Limited, Dublin (IE)

(72) Inventors: Andrew E. Fano, Lincolnshire, IL (US); Jurgen Albert Weichenberger, Woking (GB)

(73) Assignee: Accenture Global Solutions Limited, Dublin (IE)

( * ) Notice: Subject to any disclaimer, the term of this patent is extended or adjusted under 35 U.S.C. 154(b) by 770 days.

(21) Appl. No.: 15/491,810

(22) Filed: Apr. 19, 2017

(65) Prior Publication Data

US 2018/0307988 A1 Oct. 25, 2018

(51) Int. Cl.
*G06N 5/04* (2006.01)
*G06N 10/00* (2019.01)
*G06N 7/04* (2006.01)

(52) U.S. Cl.
CPC .............. *G06N 5/04* (2013.01); *G06N 7/04* (2013.01); *G06N 10/00* (2019.01)

(58) Field of Classification Search
CPC .......... G06N 10/00; G06N 5/04; G06N 99/00; G04N 7/04; G06F 16/275; G06F 17/175; G06F 9/50; G06Q 40/025; G06Q 40/04; G06Q 40/06; H04L 2209/04; H04L 9/004; H04L 9/302; H04L 9/3249
USPC .......................................................... 706/45
See application file for complete search history.

(56) References Cited

U.S. PATENT DOCUMENTS

| 8,117,119 | B2 * | 2/2012 | Lindgren | G06Q 40/025 |
| | | | | 705/38 |
| 2006/0282236 | A1 * | 12/2006 | Wistmuller | G06K 9/6251 |
| | | | | 703/2 |
| 2007/0087756 | A1 * | 4/2007 | Hoffberg | G06Q 10/0631 |
| | | | | 455/450 |
| 2009/0070402 | A1 | 3/2009 | Rose et al. | |
| 2011/0238378 | A1 * | 9/2011 | Allen | G06N 10/00 |
| | | | | 702/186 |

(Continued)

FOREIGN PATENT DOCUMENTS

WO    2008/028290    3/2008

OTHER PUBLICATIONS

'Quantum principal component analysis': Lloyd, 2014, Nature Physics, pp. 631-633.*

(Continued)

*Primary Examiner* — Li B. Zhen
*Assistant Examiner* — Peter D Coughlan
(74) *Attorney, Agent, or Firm* — Fish & Richardson P.C.

(57) ABSTRACT

Methods, systems, and apparatus for solving optimization tasks. In one aspect, a system includes one or more classical processors and one or more quantum computing resources, wherein the one or more classical processors and one or more quantum computing resources are configured to perform operations comprising receiving input data comprising data specifying a computational task to be solved; processing the received input data using a first quantum computing resource to generate data representing a reduced computational task, wherein the reduced computational task has lower dimensionality that the computational task; and processing the data representing the reduced computational task to obtain a solution to the computational task.

14 Claims, 3 Drawing Sheets

(56) References Cited

U.S. PATENT DOCUMENTS

| | | | | |
|---|---|---|---|---|
| 2014/0187427 | A1* | 7/2014 | Macready | G06N 5/02 |
| | | | | 505/170 |
| 2014/0358852 | A1* | 12/2014 | Yurchenko | G06F 16/275 |
| | | | | 707/610 |
| 2015/0006443 | A1* | 1/2015 | Rose | G06K 9/00986 |
| | | | | 706/12 |
| 2015/0349780 | A1* | 12/2015 | Naaman | G06N 10/00 |
| | | | | 326/5 |
| 2017/0073756 | A1* | 3/2017 | Jensen | C12Q 1/6883 |
| 2017/0104493 | A1* | 4/2017 | Goto | H01L 39/223 |

OTHER PUBLICATIONS

'Quantum Recurrent Neural Networks for Filtering': Ahamed, 2009.*

"Quantum Computer Science": Mermin, 2007, Cambridge University Press.*

'Reversible artihmetic coding for quantum data compression': Chuang, 2000, IEEE, pp. 1104-1116 (Year: 2000).*

'arxiv.org' [online]. "Quantum principal component analysis," Jul. 1, 2013, [Retrieved Sep. 21, 2017], Retrieved from the Internet: URL< https://arxiv.org/abs/1307.0401 >, 2 pages.

Scott Aaronson, "Quantum Machine Learning Algorithms: Read the Fine Print," 2015, 5 pages.

'arxiv.com' [online]. "A Tutorial on Principal Component Analysis," Apr. 3, 2014, [Retrieved Sep. 21, 2017], Retrieved from the Internet: URL< https://arxiv.org/abs/1404.1100# >, 2 pages.

'iopscience.iop.org' [online]. "Quantum discriminant analysis for dimensionality reduction and classification," Jul. 6, 2016, [Retrieved Sep. 21, 2017], Retrieved from the Internet: URL< http://iopscience.iop.org/article/10.1088/1367-2630/18/7/073011/meta>, 11 pages.

Cong et al., "Quantum discriminant analysis for dimensionality reduction and classification," New Journal of Physics, Jul. 6, 2016, 18:7 1-9.

EP International Search Report and Written Opinion in European Application No. 18161884.4, dated Sep. 3, 2018, 8 pages.

Harrow et al., "Quantum algorithm for solving linear systems of equations," arXiv.0811.3171v3, Cornell University Library, Sep. 30, 2009, 15 pages.

Hashizume et al., "Singular-value decomposition using quantum annealing," Physical Review E, Aug. 12, 2015, 92:2 6 pages.

\* cited by examiner

SOLVING COMPUTATIONAL TASKS USING QUANTUM COMPUTING

BACKGROUND

An optimization task is a task of finding a best solution to a problem from all feasible solutions to the problem. To perform an optimization task, quantum hardware, e.g., a quantum computing device, may be constructed and programmed to encode the solution to a corresponding machine optimization problem into an energy spectrum of a many-body quantum Hamiltonian characterizing the quantum hardware. For example, the solution is encoded in the ground state of the Hamiltonian.

SUMMARY

This specification relates to solving complex computational tasks using a quantum computation engine. The computation engine generates solutions to the complex computational tasks by making nested calls to multiple quantum computing devices. A first call to a quantum computing device may be performed to reduce the complexity of the computational task, e.g., to reduce a number of variables specified by the computational task. A second call to a quantum computing device may be performed to generate a solution to the reduced computational task. The solution to the reduced computational task may be used as an accurate approximation of the solution to the original, complex computational task.

In general, one innovative aspect of the subject matter described in this specification can be implemented in a computer implemented method for solving a computational task using a system including multiple computing resources, where the multiple computing resources comprise at least one quantum computing resource, the method including the actions of: receiving input data comprising data specifying the computational task to be solved; processing the received input data using a first quantum computing resource to generate data representing a reduced computational task, wherein the reduced computational task has lower dimensionality that the computational task; and processing the data representing the reduced computational task to obtain a solution to the computational task.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the dimensionality of the computational task is based on a number of variables specified by the computational task.

In some implementations processing the received input data using the first quantum computing resource to generate data representing a reduced computational task comprises performing principal component analysis.

In some implementations the first quantum computing resource comprises a quantum gate computer or a quantum annealer.

In some implementations the generated solution to the computational task is obtained from a second quantum computing resource.

In some implementations the second quantum computing resource comprises a (i) quantum gate computer, (ii) quantum annealer, or (iii) quantum simulator.

In some implementations the generated solution to the computational task is obtained from a classical computing resource.

In some implementations the computational task is an optimization task.

In some implementations the input data comprises (i) data specifying the optimization task to be solved, and (ii) data specifying task objectives for solving the optimization task, comprising one or more local task objectives and one or more global task objectives.

In some implementations processing the data representing the reduced optimization task to obtain a solution to the optimization task comprises: processing the received input data to obtain one or more initial solutions to the optimization task based on the local task objectives; and processing the generated one or more initial solutions to generate a global solution to the optimization task based on the global task objectives.

The subject matter described in this specification can be implemented in particular ways so as to realize one or more of the following advantages.

Some computational tasks are too complex to solve using classical computing devices. For example, some current cryptographic protocols for secure data transmission such as RSA or Diffie-Hellman rely on the impracticality of performing integer factorization for sufficiently large integers using classical computers. In some cases, quantum computing devices may be used to solve such computational tasks. For example, according to Shor's algorithm, quantum computing devices may be used to factor integers of arbitrary size in polynomial time.

Alternatively or in addition, for some computational tasks, quantum computing devices may offer an increase in computational speed compared to classical devices. For example, quantum computers may achieve a polynomial increase in speed for tasks such as database searching or evaluating NAND trees. As another example, quantum annealers may achieve a computational increase in speed compared to classical annealers for some optimization tasks. For example, determining a global minimum or maximum of a complex manifold is an extremely challenging task. If a mapping exists for such an optimization task from the classical domain to the quantum domain appropriate for an available quantum annealer, using the quantum annealer to solve the optimization task can be an accurate and efficient alternative to using classical devices.

In some cases, however, computational tasks may be too complex or high-dimensional to solve using classical or quantum computing resources. A quantum computation engine, as described in this specification, uses nested calls to quantum computing devices to solve such computational tasks. First calls to quantum computing devices may be used to transform computational tasks into computational tasks with lower dimensionality and/or lower complexity. Further calls to classical or quantum computing resources may be used to solve the transformed computational tasks and generate approximate solutions to the computational tasks.

In this manner, the quantum computation engine may be used to solve computational tasks that are intractable to other computation engines.

In addition, the quantum computation engine described in this specification uses both classical and quantum computing devices to solve computational tasks, thus increasing the computational capabilities of the computation engine compared to computation engines that do not include both classical and quantum computing devices. For example, typically the number of variables that can be efficiently described by a purely classical system is restricted. A quantum computation engine, as described in this specification, combines quantum technology with classical technology in such a manner that allows the system to describe an increased number of variables compared to a classical system. Therefore, solutions to computational tasks generated by the quantum computation engine may be more accurate than solutions generated by a classical optimization system. In addition, the quantum computation engine may be applied to a wider range of computational tasks than a classical system.

A quantum computation engine, as described in this specification, may be used to solve optimization tasks from a wide range of applications, including but not limited to machine learning, sampling/Monte Carlo, information security, pattern recognition, image analysis, systems design, precision agriculture, scheduling, network design and bioinformatics.

In some implementations, a quantum computation engine, as described in this specification, may be able to process sparse inputs or linear forward computations during an execution of a dimensionality reduction process.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This specification describes a quantum computation engine that uses multiple calls to quantum computing resources to solve complex computational tasks. Complex computational tasks include computational tasks that are too difficult for classical or quantum computing resources to solve, e.g., computational tasks with an intractable number of task variables.

A first call to a first quantum computing resource is used to reduce the complexity of the computational task, e.g., to reduce the number of variables included the computational task. The first quantum computing resource may be configured to perform quantum algorithms such as quantum machine learning algorithms, clustering, pattern-matching or principal component analysis to reduce the complexity of the computational task. In some cases, the first quantum computing resource may be a quantum annealer. In other cases, the first quantum computing resource may be a quantum computer, e.g., a quantum circuit.

Subsequent calls to a second computing resource is used to solve the computational task. Since the complexity of the reduced computational task is smaller than the complexity of the computational task as received by the system, the second computing resource may efficiently perform the reduced computational task to generate a solution that may be used as an approximate solution to the original computational task. In some cases the reduced computational task may be performed using a second quantum computing device. In other cases the reduced computational task may be small enough/practical enough to solve using classical computing resources.

Example Operating Environment

Figure 1:
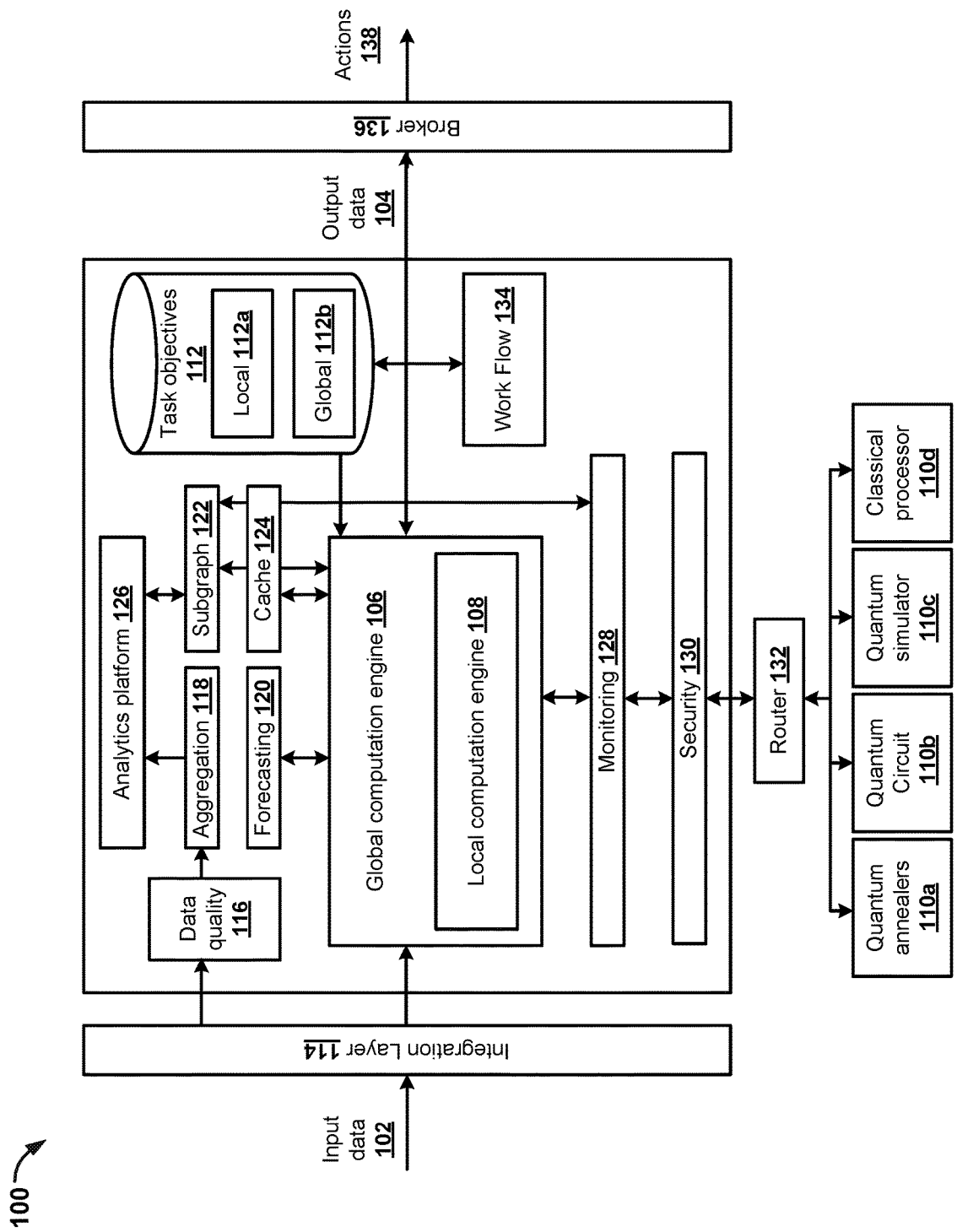
FIG. 1 depicts an example quantum computation engine.

FIG. 1 depicts an example quantum computation engine 100. The quantum computation engine 100 is an example of a system implemented as computer programs on one or more classical or quantum computing devices in one or more locations, in which the systems, components, and techniques described below can be implemented. Components of the quantum computation engine 100 may be interconnected by a digital and/or quantum data communication network.

The quantum computation engine 100 is configured to receive as input data representing a computational task to be solved, e.g., input data 102. For example, in some cases the quantum computation engine 100 may be configured to solve multiple computational tasks, and the input data 102 may be data that specifies one of the multiple computational tasks. The input data 102 representing the computational task to be solved may specify one or more properties of the computational task, parameters associated with the computational task, e.g., parameters over which an objective function representing a computational task is to be optimized, and one or more values of the parameters. Example computational tasks include, but are not limited to, optimization tasks, decision problems, counting problems or function problems. In some cases the input data 102 may include static input data and dynamic input data, e.g., real-time input data.

For example, the input data 102 may be data that represents the task of optimizing the design of a water network, e.g., to improve the amount of water delivered by the network, or to reduce the amount of water wastage in the network. In this example, the input data 102 may include static input data representing one or more properties of the water network, e.g., a total number of available water pipes, a total number of available connecting nodes or a total number of available water tanks. In addition, the input data 102 may include data representing one or more parameters associated with the computational task, e.g., level of water pressure in each pipe, level of water pressure at each connecting node, height of water level in each water tank, concentration of chemicals in the water throughout the network, water age or water source. Furthermore, the input data 102 may include dynamic input data representing one or more current properties or values of parameters of the water network, e.g., a current number of water pipes in use, a current level of water pressure in each pipe, a current concentration of chemicals in the water, or a current temperature of the water.

The computational task represented by the input data 102 may be associated with one or more measures of computational task dimensionality or complexity. For example, the dimensionality of the computational task may be measured based on a number of variables specified by the computational task. As another example, the complexity of the computational task may be measured based on an amount of computational resources, e.g., classical resources, needed to solve the task, such as time and storage. Other example complexity measures include an amount of communication required to solve the task, number of gates in a circuit used to solve the task, or number of processors used to solve the task In some implementations, the input data 102 may further include data specifying one or more task objectives associated with the computational task. The task objectives may include local task objectives and global task objectives. Local task objectives may include local targets to be considered when solving the computational task, e.g., local objectives of a solution to the computational task. For example, local objectives may include constraints on values of subsets of computational task variables. Global task objectives may include global targets to be considered when solving the computational task, e.g., global objectives of a solution to the computational task.

For example, continuing the above example of the task of optimizing a water network, the input data 102 may further include data specifying local task objectives such as a constraint on the concentration of chemicals in the water, e.g., constraining the chemical concentration to between 0.2% and 0.5%, and on the number of water pipes in use, e.g., constraining the total number of water pipes to less than 1000. Another example local task objective may be to optimize a particular portion of the water network. In addition, the input data 102 may further include data specifying global task objectives such as one or more global targets, e.g., a target of keeping water wastage to below 2% or a target of distributing at least 10 million gallons of water per day.

In other implementations, data specifying one or more task objectives associated with the computational task may be stored in the quantum computation engine 100, e.g., in task objective data store 112. For example, as described above, the quantum computation engine 100 may be configured to solve multiple computational tasks and the input data 102 may be data that specifies one of the multiple computational tasks. In this example, the quantum computation engine 100 may be configured to store task objectives corresponding to each computational task that it is configured to perform. For convenience, data specifying one or more task objectives associated with the computational task is described as being stored in task objective data store 112 throughout the remainder of this document.

The quantum computation engine 100 is configured to process the received input data 102 to generate output data 104. In some implementations, the generated output data 104 may include data representing a global solution to the computational task specified by the input data 102, e.g., a global solution to the computational task based on one or more global task objectives 112b. In some cases, the generated output data 104 may include data representing an approximate global solution to the computational task specified by the input data 102. For example, as described in more detail below and with reference to FIG. 3, in some cases the computational task represented by the input data 102 may be too complex or high-dimensional for available computing resources to solve. In these cases, the quantum computation engine 100 may be configured to process the received input data 102 to generate data representing a reduced computational task to be solved, and may process this data to generate output data 104. Processing received input data representing a computational task to be solved and one or more objectives for solving the computational task to generate output data representing a global solution to the computational task is described in more detail below with reference to FIGS. 2 and 3.

In other implementations or in addition, the output data 104 may include data representing one or more local solutions to the computational task, e.g., one or more initial solutions to the computational task that are based on local task objectives 112a and global task objectives 112b. Local solutions to the computational task may include solutions to sub-tasks of the computational task. For example, local solutions may include solutions that are optimal over a subset of the parameters associated with the computational task, e.g., where the subset is specified by the local task objectives 112a. That is, local solutions may include solutions that are optimal over a subspace, or local space, of a global search space of the computational task. For example, a local space may be the result of a projection of a multi-dimensional spline representing the global search space to a two-dimensional base space.

As another example, in cases where the computational task is a separable task, e.g., a task that may be written as the sum of multiple sub-tasks, local solutions may include optimal solutions to each of the sub-tasks in the sum of sub-tasks, e.g., where the sub-tasks are specified by the local task objectives 112a.

For example, continuing the above example of the task of optimizing a water network, the output data 104 may include data representing a globally optimal configuration (with respect to global task objectives, e.g., wastage targets and productivity targets) of the above described parameters associated with the water network optimization task. Alternatively, or in addition, the output data 104 may include data representing multiple local solutions to the water network optimization task, e.g., data specifying an optimal number of water pipes to use, an associated water pressure in each pipe, or a concentration of chemicals in the water flowing through the network. In some implementations, parameter values specified by local solutions may be the same as parameter values specified by a global solution. In other implementations, parameter values specified by local solutions may differ from parameter values specified by a global solution, e.g., a local solution may suggest a chemical concentration of 0.4%, whereas a global solution may suggest a chemical concentration of 0.3%.

The output data 104 may be used to initiate one or more actions associated with the computational task specified by the input data 102, e.g., actions 138. For example, continuing the above example of the task of optimizing a water network, the output data 104 may be used to adjust one or more parameters in the water network, e.g., increase or decrease a current water chemical concentration, increase or decrease a number of water pipes in use, or increase or decrease one or more water pipe pressures.

Optionally, the quantum computation engine 100 may include an integration layer 114 and a broker 136. The integration layer 114 may be configured to manage received input data, e.g., input data 102. For example, the integration layer 114 may manage data transport connectivity, manage data access authorization, or monitor data feeds coming into the system 100.

The broker 136 may be configured to receive output data 104 from the quantum computation engine and to generate one or more actions to be taken, e.g., actions 138. The actions may include local actions, e.g., adjustments to a subset of computation parameters, which contribute towards achieving local and global targets of the computational task.

The quantum computation engine 100 includes a global computation engine 106, which in turn includes a local computation engine 108. The global computation engine 106 is configured to receive the input data 102 and task objectives 112 for the computational task specified by the input data 102, and to provide the input data 102 and one or more local task objectives 112a to the local computation engine 108.

The local computation engine 108 is configured to process the received data to obtain one or more initial solutions to the computational task based on the one or more local task objectives 112a, e.g., one or more local solutions to the computational task.

In some implementations, the local computation engine 108 may be configured to process received data using one or more computing resources included in the local computation engine 108 or otherwise included in the quantum computation engine 100. In other implementations, the local computation engine may be configured to process received data using one or more external computing resources, e.g., additional computing resources 110a-110d. For example, the local computation engine 108 may be configured to analyze the received input data 102 representing the computational task to be solved and the data representing corresponding local task objectives 112a, and outsource one or more computations associated with solving the computational task based on the local task objectives 112a to the additional computing resources 110a-110d.

The additional computing resources 110a-110d may include multiple quantum annealer computing resources, e.g., quantum annealers 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcome localized barriers in the energy landscape which cannot be overcome by classically described system. An example quantum annealer is described in more detail below with reference to FIG. 2. In some implementations, one or more of the quantum annealers 110a may be configured to perform dimensionality reduction algorithms, e.g., principal component analysis or independent component analysis, and/or complexity reduction algorithms, e.g., circuit minimization or logic optimization algorithms.

The additional computing resources 110a-110d may include one or more quantum gate processors, e.g., quantum gate processor 110b. A quantum gate processor includes one or more quantum circuits, i.e., models for quantum computation in which a computation is performed using a sequence of quantum logic gates, operating on a number of qubits (quantum bits). In some implementations, one or more of the quantum gate processors 110b may be configured to perform dimensionality reduction algorithms, e.g., principal component analysis or independent component analysis, and/or complexity reduction algorithms, e.g., circuit minimization or logic optimization algorithms.

The additional computing resources 110a-110d may include one or more quantum simulators, e.g., quantum simulator 110c. A quantum simulator is a quantum computer that may be programmed to simulate other quantum systems and their properties. Example quantum simulators include experimental platforms such as systems of ultracold quantum gases, trapped ions, photonic systems or superconducting circuits.

The additional computing resources 110a-110d may include one or more classical processors, e.g., classical processor 110d. In some implementations, the one or more classical processors, e.g., classical processor 110d, may include supercomputers, i.e., computers with high levels of computational capacity. For example, the classical processor 110d may represent a computational system with a large number of processors, e.g., a distributed computing system or a computer cluster.

The quantum computation engine 100 includes a router 132 that is configured to determine which, if any, computations to outsource to the additional computing resources 110a-110d. Determining which, if any, computations to outsource to the additional computing resources 110a-110d is dependent on multiple factors, including the type of computations, current availability of the additional computing resources 110a-110d, cost of running the additional computing resources 110a-110d, and the type of computational task. For example, in some cases an additional computing resource may be configured to perform only a limited number of specific computational tasks or types of computational tasks.

As described briefly above, in some implementations the dimensionality and/or complexity of the computational task represented by the input data 102 may be too high to enable the computational task to be efficiently solved using the additional computing resources 110a-110d. For example, to solve the computational task in an acceptable time, e.g., a predetermined finite time, the quantum computation engine 100 may require access to one or more classical computing resources, e.g., classical computing resources 110d, that operate using a minimum number of bits, or to one or more quantum computing resources, e.g., quantum computing resources 110a-110c, that operate using a minimum number of qubits. However, in some cases the number of bits or qubits included in the additional computing resources 110a-110d may be limited and not sufficient to solve the computational task in the acceptable time. For example, when performing phase estimation algorithms, eigenvalues and eigenvectors of the unitary operator describing the unitary evolution of a quantum state can be estimated to accuracy $\varrho$ by applying a quantum phase algorithm for a time $t=O(\varrho^{-1})$, and requires $n=O(1/\varrho^3)$ copies of the state $\rho$.

As another example, the computational task may be an intractable task—that is a task that may be solved in theory, but which in practice takes too long for its solution to be useful. Example intractable tasks include NP computational tasks (under the assumption that NP is not equal to P).

In these implementations, the global computation engine 106 may be configured to determine that the dimensionality and/or complexity of the computational task represented by the input data 102 is too high to enable the computational task to be efficiently solved using the additional computing resources 110a-110d or that solution of the task could benefit from a reduction in complexity. The global computation engine 106 may then instruct the router 132 to determine which additional computing resource 110a-110d to provide the received input data 102 to, and may provide the received input data 102 to the determined computing resource together with data specifying that the additional computing resource is to perform a dimensionality or complexity reduction algorithm on the input data 102. For example, the router 132 may be configured to determine that the input data 102 be provided to a quantum annealer, e.g., one of quantum annealers 110a. The quantum annealer may then perform a dimensionality or complexity reduction algorithm, e.g., principal component analysis, on the input data 102. In some cases the data specifying that the additional computing resource is to perform a dimensionality or complexity reduction algorithm on the input data 102 may indicate a target dimensionality or complexity, e.g., a predetermined dimensionality or complexity chosen based on one or more of (i) the computational task to be solved, (ii) the computational capabilities of the additional computing resources 110a-110d, and (iii) the received input data 102. In some cases a Jaynes-Cummings model may be used to determine a target dimensionality.

The router may be further configured to receive, from the quantum computing resource, data representing a reduced computational task. The reduced computational task may be a computational task that has lower dimensionality than the computational task. For example, the reduced computational task may specify a lower number of variables than the original computational task. Alternatively, or in addition, the reduced computational task may be a computational task that has lower complexity than the computational task. For example, solving the reduced computational task may require less computational resources than solving the original computational task, less communication, fewer logic gates or fewer processors. Data representing the reduced computational task may be provided to the global computation engine 106 for processing, as described above.

Optionally, the quantum computation engine 100 may include a monitoring module 128. The monitoring module 128 is configured to monitor interactions between and transactions to and from the one or more additional computing resources 110a-d. For example, the monitoring module 128 may be configured to detect failed or stuck calls to one or more of the additional computing resources 110a-d. Example failures that can cause a call to one or more of the additional computing resources 110a-d to fail or get stuck include issues with a transport layer included in the system 100, i.e., issues with data being moved through the cloud, security login failures, or issues with the additional computing resources 110a-d themselves such as performance or availability of the additional computing resources 110a-d. The monitoring module 128 may be configured to process detected failed or stuck calls to one or more of the additional computing resources 110a-d and determine one or more corrective actions to be taken by the system 100 in response to the failed or stuck calls. Alternatively, the monitoring module 128 may be configured to notify other components of the system 100, e.g., the global computation engine 106 or router 132, of detected failed or stuck calls to one or more of the additional computing resources 110a-d.

For example, if one or more computations are outsourced to a particular quantum computing resource, and the particular quantum computing resource suddenly becomes unavailable or is processing outsourced computations too slowly, the monitoring module 128 may be configured to notify relevant components of the system 100, e.g., the router 132 or global computation engine 106. The monitoring system 128 may be further configured to provide the relevant components of the system with a suggested corrective action, e.g., instructing the system 100 to outsource the computation to a different computing resource or to retry the computation using the same computing resource. Generally, the suggested corrective actions may include actions that keep the system 100 successfully operating in real time, e.g., even when resource degradations outside of the system 100 are occurring.

Optionally, the quantum computation engine 100 may include a security component 130. The security component 130 may be configured to perform operations relating to the security of the system 100. Example operations include, but are not limited to, preventing system intrusions, detecting system intrusions, providing authentication to external systems, encrypting data received by and output by the system 100, and preventing and/or remedying denial of service (DoS).

The local computation engine 108 is configured to provide the one or more obtained initial solutions to the computational task to the global computation engine 106. The global computation engine 106 is configured to process the received one or more initial solutions to the computational task using a quantum computing resource to generate a global solution to the computational task based on the global task objectives 112b. Generating a global solution to a computational task based on one or more initial solutions to the computational task and on one or more global task objectives is described in more detail below with reference to FIGS. 2, 3 and 4.

Optionally, the quantum computation engine 100 may include a subgraph module 122. The subgraph module 122 may be configured to partition a computational task into multiple sub-tasks. For example, the subgraph module 122 may be configured to analyze data specifying a computational task to be solved, and to map the computational task to multiple minimally connected subgraphs. The minimally connected subgraphs may be provided to the global computation engine for processing, e.g., such processing may involve providing the subgraphs to the additional computing resources 110a-110d.

Optionally, the quantum computation engine 100 may include a cache 124. The cache 124 is configured to store previously generated initial solutions and global solutions to computational tasks that the quantum computation engine has previously been used to solve. In some cases this may include initial and global solutions to a same computational task, e.g., with different task objectives or different dynamic input data. In other cases this may include initial and global solutions to different computational tasks. The cache 124 may be configured to store previously generated initial solutions and global solutions to previously received computational tasks from a specified time frame of interest, e.g., initial and global solutions generated within the last 24 hours. The cache may store the initial and global solutions with a corresponding label that identifies the computational task to which the solutions belong, the task objectives associated with the initial and global solutions, and the system input data associated with the computational task.

During operation, the global computation engine 106 and local computation engine 108 may be configured to query the cache 124 to determine whether existing initial or global solutions to a received computational task with corresponding task objectives exists in the cache. If it is determined that existing initial or global solutions do exist, the local computation engine and global computation engine may retrieve the solutions and provide the solutions directly as output, e.g., as output data 104. If it is determined that existing initial or global solutions do not exist, the local computation engine 106 and global computation engine 108 may process the received data as described above.

In some implementations, the system 100 may be configured to determine whether a solution to a similar computational task is stored in the cache 124. For example, the system 100 may be configured to compare a received computational task to one or more other computational tasks, e.g., computational tasks that have previously received by the system 100, and determine one or more respective computational task similarity scores. If one or more of the determined similarity scores exceed a predetermined similarity threshold, the system 100 may determine that the computational task is similar to another computational task, and may use a previously obtained solution to the computational task as an initial solution to the computational task, or as a final solution to the computational task. In some cases similarity thresholds may be predetermined as part of an initial learning and parameter configuration process.

Optionally, the quantum computation engine 100 may include a forecasting module 120. The forecasting module 120 forecasts future global solutions and their impact on data entering the system 100, e.g., their impact on future input data 102. In some implementations the forecasting module 120 may be configured to forecast future global solutions within a remaining time of a particular time frame of interest, e.g., for the next 10 hours of a current 24 hour period.

For example, the forecasting module 120 may include forecast data from historical periods of time. Forecast data may be compared to current conditions and computational task objectives to determine whether a current computational task and corresponding task objectives are similar to previously seen computational tasks and corresponding task objectives. For example, the system 100 may include forecast data for a period of interest, e.g., a 24 hour period of interest on a particular day of the week. In this example, on a similar day of the week at a later time, the system 100 may use forecast data for the period of interest to determine whether conditions and computational task objectives for the current period of interest is similar to the conditions and computational task objectives for the previous period of interest. If it is determined that the conditions and computational task objectives for the current period of interest is similar to the conditions and computational task objectives for the previous period of interest, the system 100 may leverage previous results of previously seen computational tasks as future forecast data points until the forecast data points are replaced by real results from current calculations.

As another example, the forecasting module 120 may be configured to receive real time input data that may be used to forecasts future global solutions and their impact on data entering the system 100. For example, current weather conditions may be used to forecast future global solutions to computational tasks related to water network optimization or precision agriculture.

Optionally, the quantum computation engine 100 may include a data quality module 116. The data quality module 116 is configured to receive the input data 102 and to analyze the input data 102 to determine a quality of the input data 102. For example, the data quality module 116 may score the received input data 102 with respect to one or more data quality measures, e.g., completeness, uniqueness, timeliness, validity, accuracy or consistency. For example, in some implementations the system 100 may be configured to receive a data feed from an internet of things (IoT) sensor, e.g., that tracks the position of an object or entity within an environment. If the data quality module 116 determines that one of these objects or entities has moved an unrealistic distance in a particular period of time, the data quality module 116 may determine that the quality of the received data feed is questionable and that the data feed may need to be further analyzed or suspended.

Each measure may be associated with a respective predetermined score threshold that may be used to determine whether data is of acceptable quality or not. For example, the data quality module 116 may determine that the input data 102 is of an acceptable quality if the scored input data 102 exceeds a majority of the predetermined score thresholds.

If it is determined that the input data 102 is of an acceptable quality, the data quality module 116 may be configured to provide the input data 102 to an aggregation module 118. The aggregation module 118 is configured to receive repeated data inputs, e.g., including input data 102, and to combine the data inputs. The aggregation module 118 may be configured to provide combined data inputs to other components of the system 100. For example, in some implementations the system 100 may include an IoT sensor that receives input data readings every 500 ms. Typically, the system 100 or a computational task corresponding to the input data readings may only require that input data readings be received every 5 seconds. Therefore, in this example, the aggregation module 118 may be configured to combine and aggregate the input readings in order to generate a simpler, e.g., low dimensional, data input. In some cases this may improve the efficiency of further calculations performed by the system 100.

If it is determined that the input data 102 is not of an acceptable quality the data quality module 116 may be configured to instruct the system 100 to process an alternative data input, e.g., a data input that is an average from previous data inputs or extrapolated from the current data stream. Alternatively, if the accuracy of a particular data input is determined to be critical to the system's ability to perform one or more computations, the data quality module 116 may be configured to enter an error condition. In these examples, the data quality module 116 may learn when and how to instruct the system 100 to process alternative data inputs through a machine learning training process.

Optionally, the quantum computation engine 100 may include an analytics platform 126. The analytics platform 126 is configured to process received data, e.g., input data 102 or data representing one or more local or global solutions to a computational task, and provide analytics and actionable insights relating to the received data.

Optionally, the quantum computation engine 100 may include a workflow module 134. The workflow module 134 may be configured to provide a user interface for assigning values to computational task parameters, defining computational task objectives, and managing the learning process by which the system 100 may be trained. The workflow module 134 may be further configured to allow for users of the system 100 to coordinate on complex objective-related tasks such that the system 100 may be used efficiently. The workflow module 134 may also be configured to allow for various levels of role-based access controls. For example, the workflow module 134 may be configured to allow a junior team member to modify some of the task objectives, but keeps them from modifying critical ones. In this manner, the workflow module 134 may reduce the likelihood that critical undesirable actions, such as the opening of large water mains in a water network, are avoided.

Figure 2:
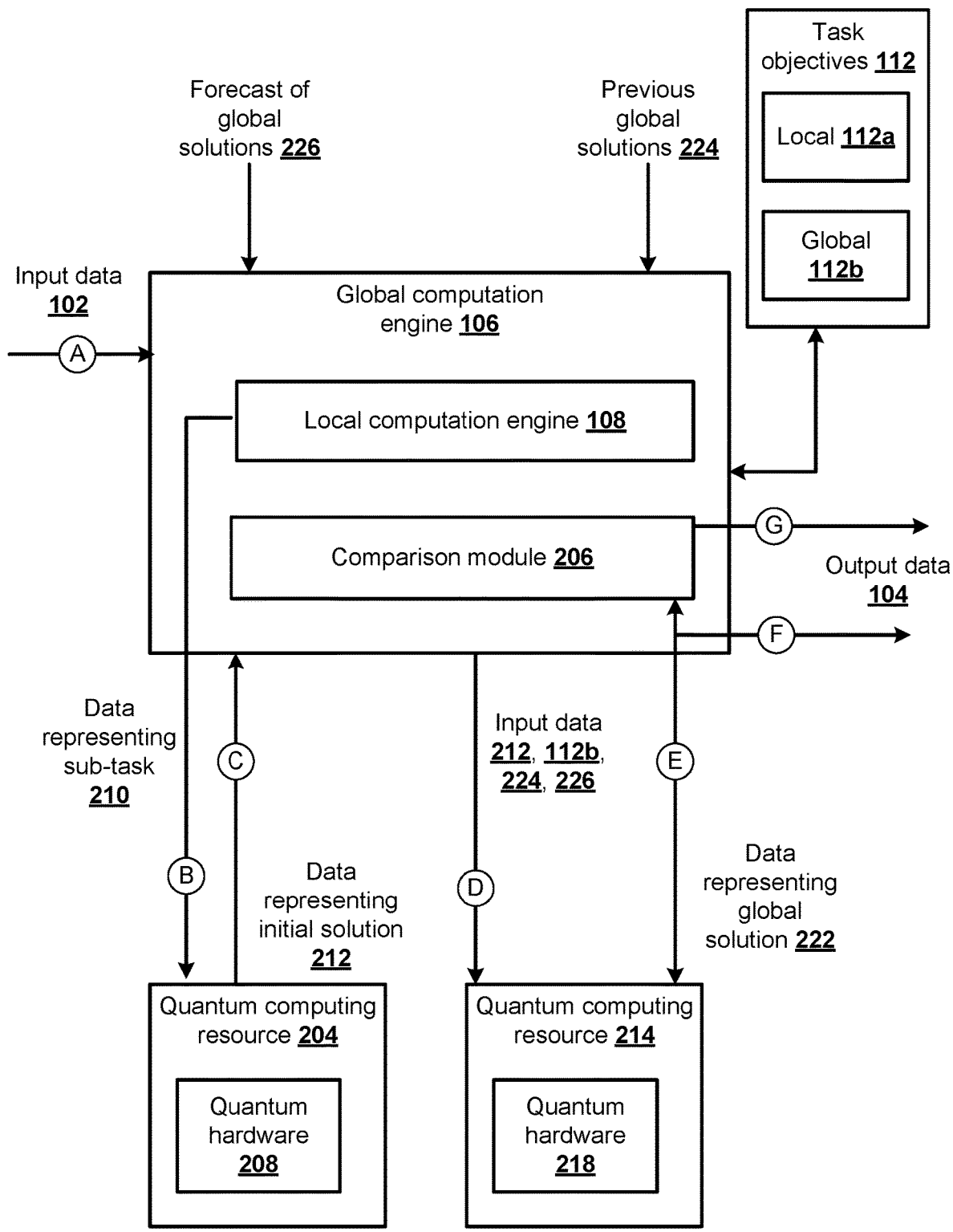
FIG. 2 depicts an example global computation engine.

FIG. 2 depicts an example global computation engine 106, as introduced above with reference to FIG. 1. The example global computation engine 106 includes a local computation engine 108 and a comparison module 206. As described above with reference to FIG. 1, the global computation engine 106 is in communication with at least one or more additional computing resources, e.g., quantum computing resource 204, and a database storing one or more task objectives, e.g., data store 112.

During operation (A), the global computation engine 106 is configured to receive input data 102 specifying a computational task to be solved, together with data representing one or more properties of the computational task and parameters of the computational task, as described above with reference to FIG. 1. The input data may include static data and dynamic data. For example, continuing the example computational task of optimizing the design of a water network described above with reference to FIG. 1A, during operation (A), the global computation engine 106 may receive dynamic data representing current readings of water pressures at various locations of the water network, and static data representing fluid dynamical characteristics of the fluid flowing through the network.

In some implementations the global computation engine 106 may be configured to receive the input data 102 directly, e.g., in a form in which the input data 102 was provided to the quantum computation engine 100 as described above with reference to FIG. 1. In other implementations the global computation engine 106 may be configured to receive the input data 102 from another component of the quantum computation engine 100, e.g., from an integration layer 114 or data quality module 116.

The global computation engine 106 may be configured to provide the received input data 102 to one of the additional computing resources 110a-110d, e.g., to a quantum annealer or quantum gate processor. The additional computing resource may be configured to process the received input data 102 to generate data representing a reduced computational task, e.g., a computational task that has lower dimensionality and/or complexity than the computational task. In some implementations, processing the received input data 102 to generate data representing a reduced computational task may include performing a dimensionality reduction algorithm, e.g., principal component analysis, as described in more detail below with reference to FIG. 3. The generated data representing the reduced computational task, hereafter referred to as reduced input data, may then be provided to the global computation engine 106.

The global computation engine 106 is configured to provide the received input data 102 (or reduced input data) or to the local computation engine 108. The local computation engine 108 is configured to process the input data 102 (or reduced input data) to obtain one or more initial solutions to the computational task (or reduced computational task) based on local task objectives 112a included in the task objectives data store 112. As described above with reference to FIG. 1, initial solutions to a computational task may include solutions to sub-tasks of the computational task. For example, initial solutions may include solutions that are optimal over a subset of parameters associated with the computational task, or, in cases where the computational task is a separable task that may be written as a sum of sub-tasks, solutions to the sub-tasks.

In some implementations, the local computation engine 108 may be configured to process the input data 102 (or reduced input data) to obtain one or more initial solutions to the computational task (or reduced computational task) by partitioning the computational task into one or more sub-tasks. For example, as described above with reference to FIG. 1, the local computation engine 108 may be in data communication with a subgraph component 122 of the quantum computation engine 100, and may be configured to provide the subgraph component 122 with data representing the computational task (or reduced computational task), and to receive data representing multiple minimally connected sub graphs representing sub-tasks of the computational task (or reduced computational task). For each sub-task, the local computation engine 108 may be further configured to identify local task objectives from the task objective data store 112 that are relevant to the sub-task. The local computation engine 108 may then be configured to route data representing each sub-task with its respective identified local task objectives to respective computing resources included in the system. The computing resources included in the system may process received tasks using a first set of algorithms, e.g., classical or quantum algorithms.

At least one of the obtained one or more initial solutions may be obtained from a quantum computing resource, e.g., quantum computing resource 204. For example, the local computation engine 108 may be configured to provide data specifying the computational task (or reduced computational task) and one or more local task objectives 112a to a quantum annealer.

To solve a computational task, e.g., an optimization task, using a quantum annealer, e.g., quantum computing resource 204, quantum hardware 208 included in the quantum annealer may be constructed and programmed to encode a solution to the optimization task into an energy spectrum of a many-body quantum Hamiltonian $H_p$ that characterizes the quantum hardware 208. For example, the solution maybe encoded in the ground state of the Hamiltonian $H_p$. The quantum hardware 208 may be configured to perform adiabatic quantum computation starting with an easy to prepare, known ground state of a known initial Hamiltonian $H_i$. Over time, as the known initial Hamiltonian $H_i$ evolves into the Hamiltonian for solving the problem $H_p$, the known ground state evolves and remains in the instantaneous ground state of the evolving Hamiltonian. The ground state of the Hamiltonian $H_p$ is obtained at the end of the evolution. The solution to the optimization task may then be readout by measuring the quantum hardware 208.

During operation (B), the local computation engine 108 may be configured to provide the quantum annealer with data representing a sub-task 210 of the computational task (or reduced computational task). For example, the local computation engine 108 may apply local task objectives to the data received at stage (A), and transmit data representing the complex task to the quantum computing resource 204.

In some implementations the local computation engine 108 may be configured to communicate with the quantum computing resource 204 to determine physical connectivities and interactions that are available within the quantum hardware 208 in order to map the sub-task to a suitable Hamiltonian $H_p$ that may be implemented by the quantum hardware 208 of the quantum computing resource 204. The local computation engine 108 may then be configured to provide the quantum computing resource 204 with data representing the Hamiltonian $H_p$. In other implementations, the quantum computing resource 204 may include one or more components that are configured to receive data representing a sub-task and one or more sub-task objectives, and to encode the received data into a suitable Hamiltonian that may be implemented by the quantum hardware 208, e.g., using a quantum compiler.

During operation (C), the global computation engine 106 is configured to receive data representing the initial solution to the sub-task, e.g., a solution set for a local computational task, from the quantum computing resource 204. The global computation engine 106 may be configured to make one or more calls to the comparison module 206, reference the global task objectives 112b, or reference static data received during stage (A) of the process to determine a complex global computational task (or global reduced computational task) to send to the quantum computing resource 214. Continuing the example described above, examples of complex global computational tasks may include the task of determining which actions to take such that, at the end of a given time period, specific water pressures, mixtures, or total accumulated flow rates are achieved, based on current input data, forecast outcomes, historical outcomes and task constraints. Although not shown in FIG. 2, the global computation engine 106 is further configured to receive data representing initial solutions to other sub-tasks from other computing resources, e.g., additional computing resources 110a-110d, as described above with reference to FIG. 1.

To generate a global solution to the computational task (or reduced computational task), during operation (D) the global computation engine 106 is configured to provide data representing the one or more initial solutions, e.g., including data representing initial solution 212, and data representing the computational task (or reduced computational task) to be solved to a second quantum computing resource 214, e.g., a second quantum annealer. The second quantum computing resource 214 may process the received data using a second set of algorithms, e.g., classical or quantum algorithms. In some cases, the second set of algorithms may differ to the first set of algorithms described above. For example, the first set of algorithms may include a first annealing schedule and the second set of algorithms may include a second annealing schedule that is different to the first annealing schedule.

In some implementations, the global computation engine 106 may be configured to provide additional data to the second quantum computing resource 214. The additional data may include, but is not limited to, data representing global task objectives 112b, data representing previously generated global solutions to previously seen computational tasks within a predetermined period of time, or data representing a forecast of global solutions to computational tasks that may be seen during a remainder of the predetermined period of time. For example, the global computation engine 106 may provide the quantum computing resource with intermediate solutions to the computational task (or reduced computational task) as part of an iterative process for generating a final solution to the computational task (or reduced computational task).

In some implementations the global computation engine 106 may be configured to communicate with the second quantum computing resource 214, e.g., a second quantum annealer, to determine physical connectivities and interactions that are available within the quantum hardware 218 in order to map the computational task (or reduced computational task) and additional data, e.g., data representing global task objectives 112b, data representing previous global solutions 224 or data representing a forecast of global solutions 226, to a suitable Hamiltonian $H'_p$ that may be implemented by the quantum hardware 218 of the second quantum computing resource 214. The global computation engine 106 may then be configured to provide the second quantum computing resource 214 with data representing the Hamiltonian $H'_p$. In other implementations, the quantum computing resource 214 may include one or more components that are configured to receive data representing the computational task (or reduced computational task) and the additional data 112b, 224 and 226, and to encode the received data into a suitable Hamiltonian that may be implemented by the quantum hardware 218, e.g., using a quantum compiler.

The second quantum computing resource 214 may be configured to receive the data representing the one or more initial solutions 212, the computational task (or reduced computational task) to be solved, and additional data 112b, 224, 226, or to receive data representing a suitable Hamiltonian $H'_p$ and to perform a quantum annealing schedule based on the received data in order to determine a global solution to the computational task (or the reduced computational task).

During operation (E), the global computation engine 106 is configured to receive data representing a global solution to the computational task (or reduced computational task) 222 from the second quantum computing resource 214. In some implementations, during operation (F), the global computation engine 106 may be configured to directly provide the data representing the global solution to the computational task (or reduced computational task) as output, e.g., as output data 104. In other implementations, the global computation engine 106 may be configured to provide the comparison module 206 with the data representing the global solution to the computational task (or reduced computational task) 222.

In cases where the global computation engine 106 directly provides the data representing a global solution to a reduced computational task as output, the data may be used as an approximation to a global solution to the computational task specified by the input data 102. By construction, i.e., through the use of the selected dimensionality reduction algorithms or complexity reduction algorithms, the data representing a global solution to a reduced computational task may be an accurate approximation of the global solution to the original computational task.

The comparison module 206 is configured to compare the data representing the generated global solution to the computational task (or reduced computational task) 222 with data representing the global task objectives 112b to determine whether the generated global solution 222 sufficiently satisfies the global task objectives 112b. For example, the comparison module 206 may be configured to apply a comparison function to the data representing the generated global solution 222 and the data representing the global task objectives 112b to generate a comparison score. The comparison module 206 may then be configured to compare the comparison score to a predetermined score threshold to determine whether the generated global solution 222 sufficiently satisfies the global task objectives 112b.

During operation (G), if the comparison module 206 determines that the generated global solution 222 sufficiently satisfies the global task objectives 112b, the comparison module may be configured to provide as output 104 data representing the global solution 222 and, optionally data representing the one or more initial solutions as obtained by the local computation engine 108, e.g., data including data representing initial solution 212.

During operation, if the comparison module 206 determines that the generated global solution 222 does not sufficiently satisfy the global task objectives 112b, the comparison module may be configured to generate modified global computation engine input data, e.g., a modified version of input data 102 or of the reduced input data. The modified data may include (i) data specifying the computational task (or reduced computational task) to be solved, and (ii) modified local task objectives for solving the computational task (or reduced computational task). Modified data includes input data, e.g., input data 102 or reduced input data, which has been altered or biased in such a manner that a next iteration of computations performed by the system for solving the computational task (or reduced computational task) will better align with the global task objectives of the computational task.

To generate modified global computation engine input data, the comparison module 206 may be configured to apply deep learning regularization techniques to the current input data (or reduced input data) to generate biased input data, e.g., biased local task objectives. This may include applying one or more dropout algorithms which selectively block computational task parameters.

For example, continuing the example computational task of optimizing the design of a water network, an example optimization task parameter may include a total number of available pipes in the water network. Initially, received input data 102 may include data specifying that there are 2000 pipes available in the water network, whereas data specifying the global task objectives for the optimization task may specify that a maximum of 1000 pipes are to be used. If a generated global solution to the optimization task specifies that 1500 pipes are to be used in an optimal design of the water network, the comparison module may be configured to determine that the generated global solution does not sufficiently satisfy the global task objectives, and may generate modified global computation engine input data for the optimization task. For example, the comparison module may selectively block or fix one or more optimization task parameters, e.g., including the number of available water pipes. Alternatively or in addition, the comparison module may bias the input data, e.g., bias the input data such that it specifies that there are 1200 pipes available in the water network instead of 2000.

The global computation engine 106 may be configured to process the modified input data as described above with reference to operations (B)-(E). For example, the global computation engine 106 may be configured to process the modified input data to obtain one or more modified solutions to the computational task (or reduced computational task) based on the modified local task objectives. The global computation engine 106 may then be configured to process the generated one or more modified solutions using the second quantum computing resource 214 to generate a modified global solution to the computational task (or reduced computational task) based on the global task objectives 112b. When it is determined that a generated global solution sufficiently satisfies the global task objectives 112b, the comparison module 206 may be configured to provide as output 104 data representing the global solution and, optionally data representing the one or more corresponding initial solutions as obtained by the local computation engine 108.

Programming the Hardware

Figure 3:
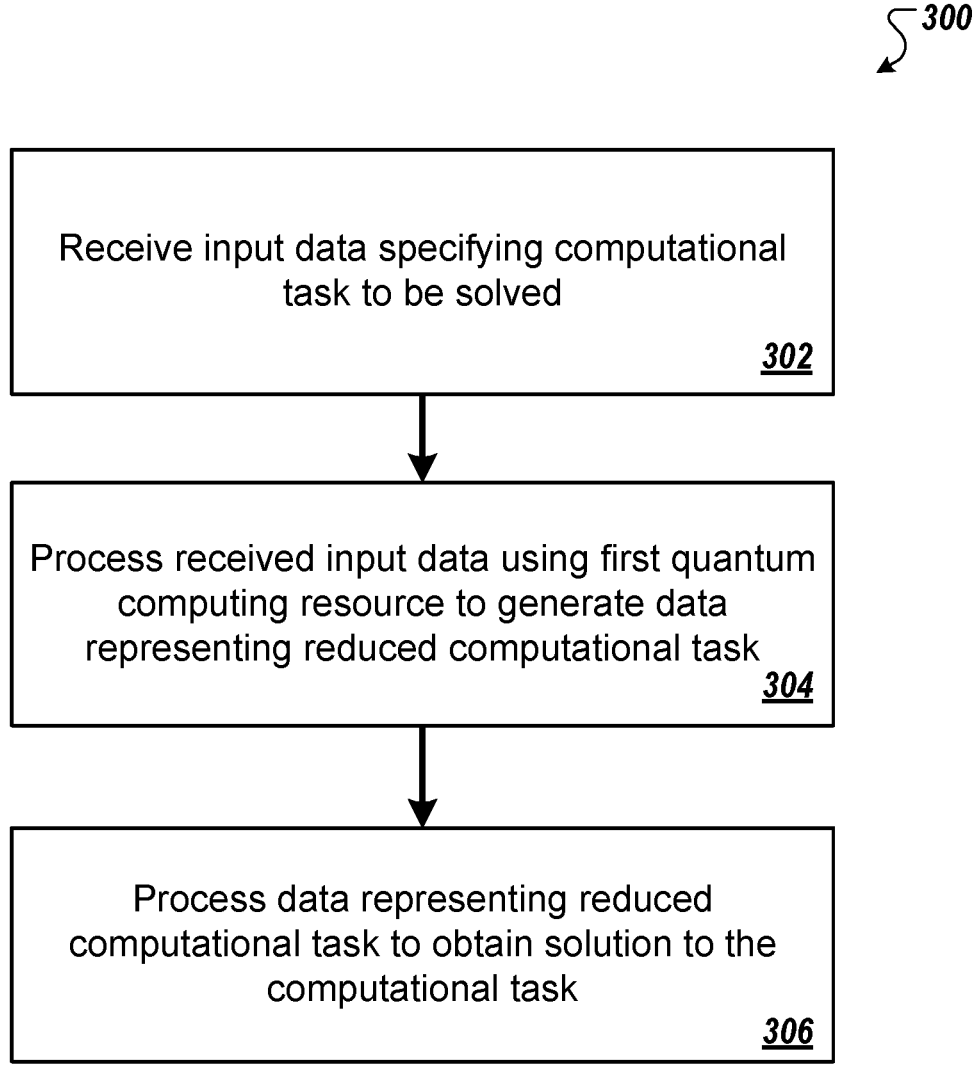
FIG. 3 is a flow diagram of an example process for generating a solution to a computational task.
Like reference numbers and designations in the various drawings indicate like elements.

FIG. 3 is a flowchart of an example process 300 for generating a solution to a computational task. For convenience, the process 300 will be described as being performed by a system of one or more classical or quantum computing devices located in one or more locations. For example, a computation engine, e.g., the quantum computation engine 100 of FIG. 1, appropriately programmed in accordance with this specification, can perform the process 300.

The system receives input data including data specifying the computational task to be solved (step 302). In some implementations the computational task may be an optimization task, as described in more detail below. In other implementations the computational task may be a decision problem, function problem, canonical correlation analysis task, or counting problem.

The computational task may be associated with one or more measures of computational task dimensionality or complexity. For example, the dimensionality of the computational task may be measured based on a number of variables specified by the computational task. As another example, the complexity of the computational task may be measured based on an amount of computational resources, e.g., classical resources, needed to solve the task, such as time and storage. Other example complexity measures include an amount of communication required to solve the task, number of gates in a circuit used to solve the task, or number of processors used to solve the task.

In some cases the dimensionality and/or complexity of the computational task may be too high to enable the computational task to be efficiently solved using available classical or quantum computing resources. For example, to solve the computational task in an acceptable time, e.g., a predetermined finite time, the system may require access to one or more classical computing resources that operate using a minimum number of bits, or to one or more quantum computing resources that operate using a minimum number of qubits. However, in some cases the number of bits or qubits included in computing resources that are available to the system may be limited and not sufficient to solve the computational task in the acceptable time. As another example, the computational task may be an intractable task—that is a task that may be solved in theory, but which in practice takes too long for its solution to be useful.

In some implementations the received input data may further include data specifying task objectives for solving the computational task. For example, as described above, in some cases the received input data may include data specifying an optimization task to be solved. In these cases the received input data may further include data specifying task objectives for solving the optimization task. The task objectives for solving the optimization task may include local task objectives and global task objectives. For example, as described above with reference to FIG. 1, the computational task to be solved may be the task of optimizing the design of a network, e.g., a water network. In this example, the data specifying the optimization task to be solved may include details about the network, e.g., a total number of available water pipes, connectors or tanks or a total network capacity. Local task objectives may include constraining the values of respective water pressures in each pipe, or constraining the values of a concentration of chemicals in the water. Global task objectives may include constraining an amount of water wastage or specifying a target distributing rate.

As another example, the computational task may be the task of optimizing a cancer radiotherapy treatment, e.g., minimizing collateral damage of radiotherapy treatment to tissue and body parts surrounding a tumor. In this example, the data specifying the optimization task to be solved may include details about the treatment, e.g., where a tumor is located, types of surrounding tissue, types of surrounding body parts, strength of treatment. Local task objectives may include constraining the strength of the treatment or specifying an area of the body, e.g., the ocular nerve, which should not be affected by the treatment. Global task objectives may include administering a particular amount or strength of treatment. Other example computational tasks may occur in areas such as machine learning, protein folding, sampling/Monte Carlo, information security, pattern recognition, image analysis, systems design, precision agriculture, scheduling, and bioinformatics.

The system processes the received input data using a first quantum computing resource to generate data representing a reduced computational task (step 304). In some implementations the reduced computational task is a computational task that has lower dimensionality than the computational task. For example, the reduced computational task may specify a lower number of variables than the original computational task. Alternatively, or in addition, the reduced computational task may be a computational task that has lower complexity than the computational task. For example, solving the reduced computational task may require less computational resources than solving the original computational task, less communication, fewer logic gates or fewer processors.

In some implementations, the system may process the received input data to generate data representing a reduced computational task by performing principal component analysis. For example, the first quantum computing resource may be a quantum annealer or quantum gate computer that is configured to implement a quantum principal component analysis algorithm.

Principal component analysis is a statistical procedure that uses an orthogonal transformation to transform a set of correlated variables into a set of linearly uncorrelated variables called principal components. The transformation is defined in such a way that the first principal component has the largest possible variance, and each succeeding component in turn has the highest variance possible under the constraint that it is orthogonal to preceding components. Not all principal components need to be kept, for example the first L components may be retained and the remaining discarded without suffering from significant loss of information. In this manner, principal component analysis may be used to perform dimensionality reduction of a set of variables. For example, the system may provide the first quantum computing resource with data specifying a target number of variables that may be efficiently handled by the available computing resources.

The first quantum computing resource may then perform principal component analysis to reduce the total number of variables to the target number of variables. Quantum computing resources are a natural candidate for performing dimensionality reduction algorithms, e.g., Principal component analysis. For example, given many copies of a quantum system in an unknown state, properties of the unknown quantum state may be revealed by performing measurements of different observables and analyzing the measurement results statistically. The unknown quantum state can play an active role in its own analysis. In particular, given multiple copies of a quantum system with density matrix $\rho$, it is possible to perform a unitary transformation $e^{-i\rho t}$. As a result, quantum coherence can be created amongst the different copies of the system to perform quantum principal component analysis, revealing the eigenvectors corresponding to the large eigenvalues of the unknown quantum state in time exponentially faster than any existing algorithm.

As another example, to implement exponentials of operators X, e.g., Hamiltonians or spin operators, $n=O(t2\varrho-1)$ copies of X are required to implement $e^{-iXt}$ to accuracy $\varrho$ in time $O(n \log d)$.

In other implementations, the system may process the received input data to generate data representing a reduced computational task by performing other dimension-reduction algorithms such as independent component analysis or network component analysis.

In further implementations, the system may process the received input data to generate data representing a reduced computational task by performing complexity reduction algorithms. For example, the system may perform a circuit minimization algorithm, logic optimization algorithm or Hadamard gate reduction algorithm to generate a reduced computational task that may be solved using a smaller number of classical or quantum logic gates than the number of classical or quantum logic gates required to solve the original computational task.

The system processes the data representing the reduced computational task to obtain a solution to the computational task (step 306). The system may process the data representing the reduced computational task using a second computing resource, e.g., a second quantum computing resource or a classical computing resource. Since the reduced computational task has a lower dimensionality and/or complexity than the original computational task described above with reference to step 302, the second computing resource may efficiently, e.g., within a predetermined finite time, generate a solution to the reduced computational task. The generated solution to the reduced computational task may then be used as an approximate solution to the original computational task. By construction, the approximate solution to the original computational task may be an optimal solution to the computational task. For example, in cases where processing received input data using a first quantum computing resource to generate data representing a reduced computational task includes performing principal component analysis, it is proven, due to the specific principal component analysis eigenvector transformation, that the solution to the reduced computational task is an optimal solution to the original computational task.

The generated global solution may be used to determine one or more actions to be taken in a system corresponding to the original and/or reduced optimization task, i.e., one or more adjustments to system parameter values.

As described above with reference to step 302, in some implementations the received input data may include data specifying an optimization task to be solved and one or more task objectives for solving the optimization task. In these implementations, the system may process the data representing the reduced optimization task to obtain a solution to the optimization task by first processing the received input data to obtain one or more initial solutions to the optimization task based on the local task objectives. The system may then process the generated one or more initial solutions to generate a global solution to the optimization task based on the global task objectives.

For example, the system may process the data representing the reduced optimization task using a first quantum computing resource to obtain one or more local solutions to the reduced optimization task based on the local task objectives. As described above with reference to FIG. 1, local solutions to an optimization task may include solutions to sub-tasks of the optimization task. For example, local solutions may include solutions that are optimal over a subset of the parameters associated with the optimization task, e.g., where the subset is specified by the local task objectives. As another example, in cases where the optimization task is a separable task, e.g., a task that may be written as the sum of multiple sub-tasks, local solutions may include optimal solutions to each of the sub-tasks in the sum of sub-tasks, e.g., where the sub-tasks are specified by the local task objectives. In some implementations the local solutions may be probabilistic solutions, e.g., probability distributions over one or more parameters associated with the optimization task.

For example, continuing the first example above, local solutions to the task of optimizing a water network may include optimal values for a subset of parameters associated with the optimization task, e.g., optimal values for water pressures in one or more water pipes, or an optimal concentration of chemicals in the water in the network, or optimal values for all parameters in a portion of the water network. In addition, continuing the second example above, local solutions to the task of optimizing a cancer radiotherapy treatment may include optimal values for a subset of parameters associated with the optimization task, e.g., optimal values for a strength of treatment, or optimal values for all parameters when applied to a specific region of a patient's body.

In some implementations, the system may process the data specifying the reduced computational task to generate one or more initial local solutions to the reduced optimization task by partitioning the reduced optimization task into one or more sub-tasks. For example, the system may represent the reduced optimization task as a graph of nodes and edges, and partition the graph into multiple minimally connected sub graphs to assist computational processing of the sub-tasks. The system may then, for each sub-task, identify local task objectives relevant to the sub-task and route (i) the sub-task, and (ii) the identified local task objectives, to respective computing resources included in the system. The system may then obtain respective solutions to each of the sub-tasks from the respective computing resources included in the system.

The system may then process the generated one or more initial solutions to the reduced optimization task using a second computing resource, e.g., a classical or quantum computing resource, to generate a global solution to the reduced optimization task based on the global task objectives. For example, the second quantum computing resource may be a quantum annealer. In this example, the global solution to the reduced optimization task may be encoded into an energy spectrum of a problem Hamiltonian characterizing the quantum annealer. To generate the global solution, the quantum annealer may follow a quantum annealing schedule based on the one or more initial local solutions.

As described above with reference to FIG. 1, a global solution to an optimization task may include parameter values that, when implemented in a system corresponding to the optimization task, provide a highest likelihood that the system achieves the one or more global task objectives. In some implementations, parameter values specified by local solutions to the optimization task may be the same as parameter values specified by a global solution. In other implementations, parameter values specified by local solutions may differ from parameter values specified by a global solution.

In some implementations, the system may process the generated one or more initial local solutions to obtain a global solution to the reduced optimization task based on the global task objectives by processing the generated one or more initial local solutions together with additional data. The additional data may include (i) data representing obtained global solutions to previously received optimization tasks within a predetermined time frame, (ii) data representing a forecast of future received optimization tasks within a remaining predetermined time frame, or (iii) data representing a solution to the optimization task that is independent of the global task objectives. Including such additional data may increase the computational accuracy of the system and produce better global solutions, e.g., when compared to global solutions generated based on one or more initial local solutions and global task objectives only.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g., qubits, and quantum concepts, e.g., entanglement or superposition. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for solving a computational task using a system including multiple computing resources, wherein the computational task comprises an optimization task and the multiple computing resources comprise at least one quantum computing resource, the method comprising:
   receiving input data comprising data specifying the computational task to be solved, wherein the computational task is associated with a task dimensionality and a complexity based on an amount of classical or quantum computational resources required to solve the task;
   identifying one or more available classical or quantum computing resources;
   determining, based on the associated task dimensionality and complexity, whether the computational task is intractable for the one or more available classical or quantum computing resources, comprising determining whether a number of bits or qubits included in the one or more available classical or quantum computing resources are insufficient to solve the computational task in an acceptable time;
   in response to determining that the computational task is intractable for the one or more available classical or quantum computing resources, instructing a first quantum computing resource to perform i) dimensionality reduction algorithm and ii) a circuit minimization algorithm, logic optimization algorithm or Hadamard gate reduction algorithm on the input data, comprising providing the input data to the first quantum computing resource for processing;
   processing the received input data using the first quantum computing resource to generate data representing a reduced computational task, wherein the processing comprises performing i) a dimensionality reduction algorithm and ii) a circuit minimization algorithm, logic optimization algorithm or Hadamard gate reduction algorithm on the input data using the first quantum computing resource, and wherein the reduced computational task has lower dimensionality and lower task complexity than the computational task; and
   processing the data representing the reduced computational task using an available classical or quantum computing resource to obtain a solution to the reduced computational task, wherein i) the solution to the reduced computational task comprises an approximate solution to the computational task and ii) processing the data representing the reduced computational task to obtain a solution to the reduced computational task uses a smaller number of classical or quantum logic gates than the number of classical or quantum logic gates required to solve the computational task.

2. The method of claim 1, wherein the dimensionality of the computational task is based on a number of variables specified by the computational task.

3. The method of claim 1, wherein processing the received input data using the first quantum computing resource to generate data representing a reduced computational task comprises performing principal component analysis.

4. The method of claim 1, wherein the first quantum computing resource comprises a quantum gate computer or a quantum annealer.

5. The method of claim 1, wherein the input data comprises (i) data specifying the optimization task to be solved, and (ii) data specifying task objectives for solving the optimization task, comprising one or more local task objectives and one or more global task objectives.

6. The method of claim 5, wherein processing the data representing the reduced computational task using an available classical or quantum computing resource to obtain a solution to the optimization task comprises:
   processing the received input data to obtain one or more initial solutions to the optimization task based on the local task objectives; and
   processing the generated one or more initial solutions to generate a global solution to the optimization task based on the global task objectives.

7. The method of claim 1, wherein the reduced computational task requires less classical or quantum computational resources to solve compared to the computational task.

8. A system of multiple computing resources, comprising:
   one or more classical processors;
   one or more quantum computing resources;
   wherein the one or more classical processors and one or more quantum computing resources are configured to perform operations comprising:
      receiving input data comprising data specifying the computational task to be solved, wherein the computational task is associated with a task dimensionality and a complexity based on an amount of classical or quantum computational resources required to solve the task;
      identifying one or more available classical or quantum computing resources;
      determining, based on the associated task dimensionality and complexity, whether the computational task is intractable for the one or more available classical or quantum computing resources, comprising determining whether a number of bits or qubits included in the one or more available classical or quantum computing resources are insufficient to solve the computational task in an acceptable time;
      in response to determining that the computational task is intractable for the one or more available classical or quantum computing resources, instructing a first quantum computing resource to perform i) dimensionality reduction algorithm and ii) a circuit minimization algorithm, logic optimization algorithm or Hadamard gate reduction algorithm on the input data, comprising providing the input data to the first quantum computing resource for processing;
      processing the received input data using the first quantum computing resource to generate data representing a reduced computational task, wherein the processing comprises performing i) a dimensionality reduction algorithm and ii) a circuit minimization algorithm, logic optimization algorithm or Hadamard gate reduction algorithm on the input data using the first quantum computing resource, and wherein the reduced computational task has lower dimensionality and lower task complexity than the computational task; and
      processing the data representing the reduced computational task using an available classical or quantum computing resource to obtain a solution to the reduced computational task, wherein i) the solution to the reduced computational task comprises an approximate solution to the computational task and ii) processing the data representing the reduced computational task to obtain a solution to the reduced computational task uses a smaller number of classical or quantum logic gates than the number of classical or quantum logic gates required to solve the computational task.

9. The system of claim 8, wherein the dimensionality of the computational task is based on a number of variables specified by the computational task.

10. The system of claim 8, wherein processing the received input data using the first quantum computing resource to generate data representing a reduced computational task comprises performing principal component analysis.

11. The system of claim 8, wherein the first quantum computing resource comprises a quantum gate computer or a quantum annealer.

12. The system of claim 8, wherein the input data comprises (i) data specifying the optimization task to be solved, and (ii) data specifying task objectives for solving the optimization task, comprising one or more local task objectives and one or more global task objectives.

13. The system of claim 12, wherein processing the data representing the reduced computational task using an available classical or quantum computing resource to obtain a solution to the optimization task comprises:
　processing the received input data to obtain one or more initial solutions to the optimization task based on the local task objectives; and
　processing the generated one or more initial to generate a global solution to the optimization task based on the global task objectives.

14. The system of claim 8, wherein the reduced computational task requires less classical or quantum computational resources to solve compared to the computational task.

* * * * *

UNITED STATES PATENT AND TRADEMARK OFFICE
CERTIFICATE OF CORRECTION

| | |
|---|---|
| PATENT NO. | : 11,250,334 B2 |
| APPLICATION NO. | : 15/491810 |
| DATED | : February 15, 2022 |
| INVENTOR(S) | : Andrew E. Fano and Jurgen Albert Weichenberger |

It is certified that error appears in the above-identified patent and that said Letters Patent is hereby corrected as shown below:

On the Title Page

Item (57), Column 2 (Abstract), Line 11, delete "that" and insert -- than --.

In the Claims

In Claim 1, Column 25, Line 34, delete "i)" and insert -- i) a --.

In Claim 8, Column 26, Line 48, delete "i)" and insert -- i) a --.

Signed and Sealed this
Tenth Day of May, 2022

Katherine Kelly Vidal
*Director of the United States Patent and Trademark Office*